(12) United States Patent
Tripp

(10) Patent No.: US 8,286,404 B2
(45) Date of Patent: Oct. 16, 2012

(54) MOULDING FOR BUILDING EXTERIOR AND MACHINE FOR CUTTING SAME

(76) Inventor: Scott Tripp, Oshawa (CA)

( * ) Notice: Subject to any disclaimer, the term of this patent is extended or adjusted under 35 U.S.C. 154(b) by 439 days.

(21) Appl. No.: 12/458,280

(22) Filed: Jul. 7, 2009

(65) Prior Publication Data

US 2010/0005741 A1    Jan. 14, 2010

(51) Int. Cl.
  *E04B 1/00*    (2006.01)
  *E04G 21/00*   (2006.01)
  *E04D 13/00*   (2006.01)
  *E04D 1/36*    (2006.01)
  *B23P 17/00*   (2006.01)

(52) U.S. Cl. ............ 52/745.19; 52/11; 52/58; 52/748.1; 29/412

(58) Field of Classification Search ................ 52/11–16, 52/58, 94, 95, 98, 100, 287.1, 288.1, 741.1, 52/745.19, 748.1; 29/412, 417, 428, 401.1
See application file for complete search history.

(56) References Cited

U.S. PATENT DOCUMENTS

| | | | | |
|---|---|---|---|---|
| 3,967,452 A * | 7/1976 | Maloney et al. | ............ | 405/120 |
| 3,994,055 A * | 11/1976 | Maloney et al. | ........... | 29/890.14 |
| 5,357,719 A * | 10/1994 | Lewis | ............................ | 52/11 |
| 5,560,158 A * | 10/1996 | Norton | ............................ | 52/95 |
| 6,151,836 A * | 11/2000 | McGlothlin et al. | ............ | 52/11 |
| 6,539,675 B1 * | 4/2003 | Gile | .................................. | 52/96 |
| 6,837,020 B1 * | 1/2005 | Keddell | ........................ | 52/745.2 |
| 7,036,282 B1 * | 5/2006 | Keddell | ........................ | 52/287.1 |
| 7,334,369 B2 * | 2/2008 | Carson | ............................ | 52/11 |
| 2010/0005741 A1 * | 1/2010 | Tripp | ............................ | 52/288.1 |

* cited by examiner

*Primary Examiner* — Joshua J Michener
*Assistant Examiner* — Andrew Triggs

(57) ABSTRACT

Molding is formed by first making a longitudinally extending cut in the bottom wall of a conventional eavestrough in order to separate the eavestrough into two segments. The inner portion of the bottom wall is then attached to the exterior wall of a building beneath its eaves or elsewhere such that the back wall of the eavestrough projects outwardly. The front wall of the eavestrough is then hung from the projecting back wall so that it extends downwardly and inwardly toward the exterior wall of the building. The eavestrough is cut by means of a machine having a guide plate and a pair of cutting wheels. The guide plate has an opening of a shape similar to that of the cross-section of the eavestrough but slightly larger so that as the eavestrough is fed through the opening it is guided by the guide plate. The cutting wheels are positioned such that after the eavestrough exits from the opening, its bottom wall passes between the wheels where it is cut.

4 Claims, 6 Drawing Sheets

MOULDING FOR BUILDING EXTERIOR AND MACHINE FOR CUTTING SAME

FIELD OF THE INVENTION

This invention relates to moulding disposed beneath the roof, windows and doors of a building and more particularly to moulding composed of a length of eavestrough, a method of forming the moulding and to an apparatus for cutting the moulding from a length of eavestrough.

BACKGROUND OF THE INVENTION

A common feature of many buildings is a decorative crown moulding disposed beneath its eaves. The moulding is referred to variously as colonial trim, Victorian trim and frieze board depending on its design. The moulding is manufactured specifically for use as moulding and is generally relatively expensive.

I have invented moulding which is formed from lengths of eavestroughs. The means for forming the moulding is simple and straightforward and once formed, the moulding can be easily installed on the exterior of a building. The cost of such moulding is significantly less than that of conventional moulding yet is attractive and, like conventional moulding, enhances the appearance of a building. I have also invented a cutting machine for forming lengths of eavestrough into such moulding.

SUMMARY OF THE INVENTION

Briefly, the method of forming the moulding on the exterior of a building includes the following steps; first a longitudinally extending cut is formed in the bottom wall of a conventional eavestrough in order to separate the eavestrough into outer and inner segments. The outer segment is composed of the front wall and an outer portion of the bottom wall of the eavestrough while the inner segment is composed of the back wall of the eavestrough and a remaining inner portion of the bottom wall. The inner portion of the bottom wall is then positioned beneath the caves or elsewhere on the exterior surface of a building such that the back wall projects outwardly from the exterior surface. The front wall of the eavestrough is then hung from the projecting end of the back wall so that it extends downwardly and inwardly toward the exterior surface of the building.

The apparatus for cutting the eavestrough includes a housing; a guide plate; and a pair of cutting wheels rotatably mounted to the housing. The guide plate has an opening of a shape similar to that of the cross-section of the eavestrough and is sufficiently large to permit the eavestrough to pass through it. However the opening is not large enough to permit significant lateral movement of the eavestrough. The cutting wheels are rotatable about parallel axes and each wheel has an outer cylindrical surface, oppositely facing side surfaces and a circular cutting edge at the intersection of the cylindrical surface and one of the side surfaces. The cutting wheels are positioned such that after the eavestrough exits from the opening in the guide plate, its bottom wall passes between the cutting edges with resulting formation of an elongated cut in the bottom wall.

DESCRIPTION OF THE DRAWINGS

The moulding, the method of forming the moulding and the cutting apparatus of my invention are described with reference to the accompanying drawings in which.

Like reference characters refer to like parts throughout the description of the drawings.

DESCRIPTION OF PREFERRED METHODS AND EMBODIMENTS

Figure 1:
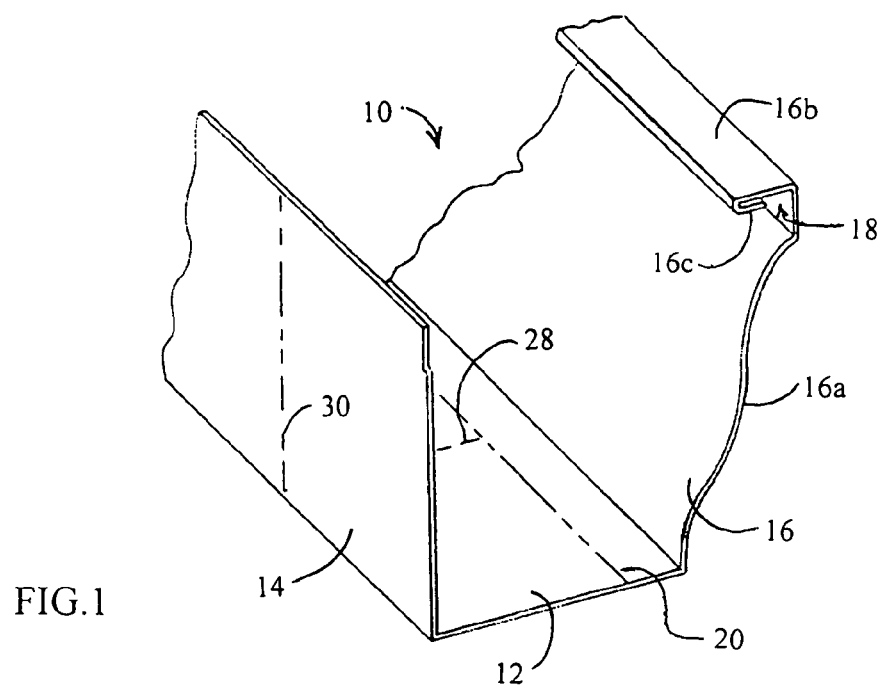
FIG. 1 is a perspective view of a conventional eavestrough or gutter and the location of cuts in it for forming the subject moulding.

With reference to FIG. 1, a conventional eavestrough or gutter, generally 10, has a bottom wall 12 and spaced apart upstanding back and front walls 14, 16, respectively. The front wall is visible from the exterior of the building and is usually provided with one or more curves 16a for aesthetic reasons. The upper portion of the front wall is folded inward at 16b and terminates at an upper edge or lip which is folded back on itself to form a loop 16c. The loop has on open mouth, generally 18 along the length of the front wall.

The back wall 14 of the eavestrough is usually nailed to a fascia of a building and is flat to ensure that it can be nailed or screwed firmly in place.

Figure 2:
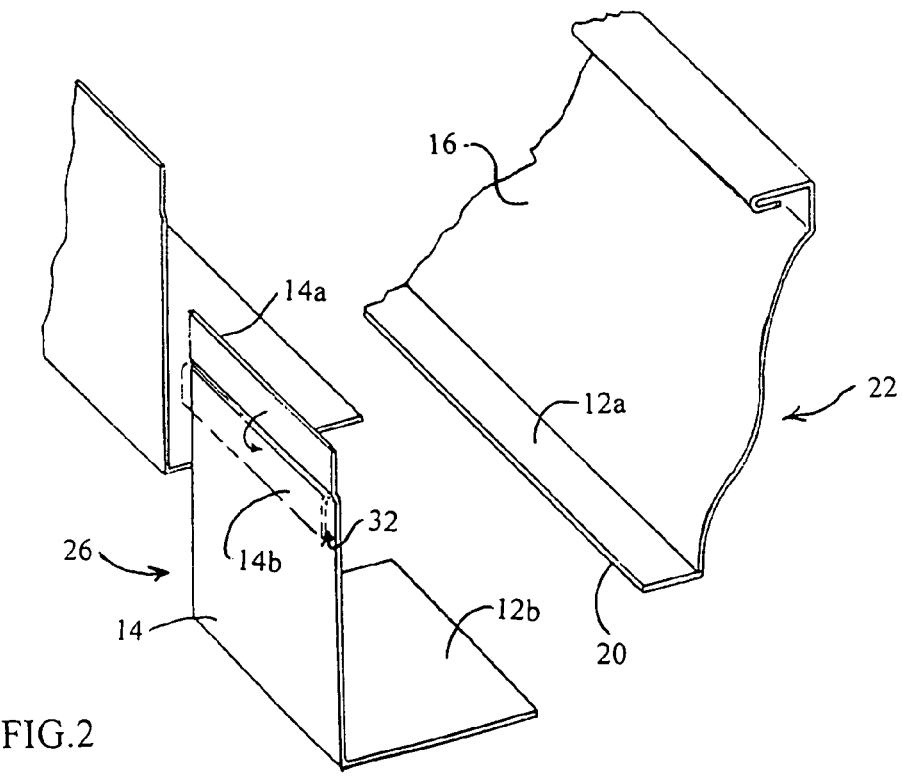
FIG. 2 is a perspective view of the eavestrough of FIG. 1 after it has been cut.

With reference to FIGS. 1 and 2, the bottom wall has a longitudinal cut 20 which separates the eavestrough into two segments, an outer segment, generally 22 which is composed of the front wall 16 and an outer cut portion 12a of the bottom wall and an inner segment, generally 26 which is composed of the back wall 14 and the remaining portion or inner cut portion 12b of the bottom wall.

The inner segment 26 can optionally be severed into one or more relatively short pieces by means of horizontal and vertical cuts 28, 30 respectively. The upper edge or lip 14a of the back wall is folded back on itself to form a loop 14b. Like loop 16c, loop 14b has an open mouth, generally 32 along the length of the back wall.

The inner segment of the eavestrough is attached beneath the eaves of a building and projects outwardly from an exterior wall of the building. The outer segment is attached to the projecting end of the inner segment and the two segments combine to form the moulding of the invention. The inner segment can also be attached beneath the windowsills or lintels of a building. The steps for attaching the inner segment beneath the eaves is described with reference to FIGS. 3 to 5. The same steps are followed when the inner segment is attached beneath the windowsills or lintels.

Figure 3:
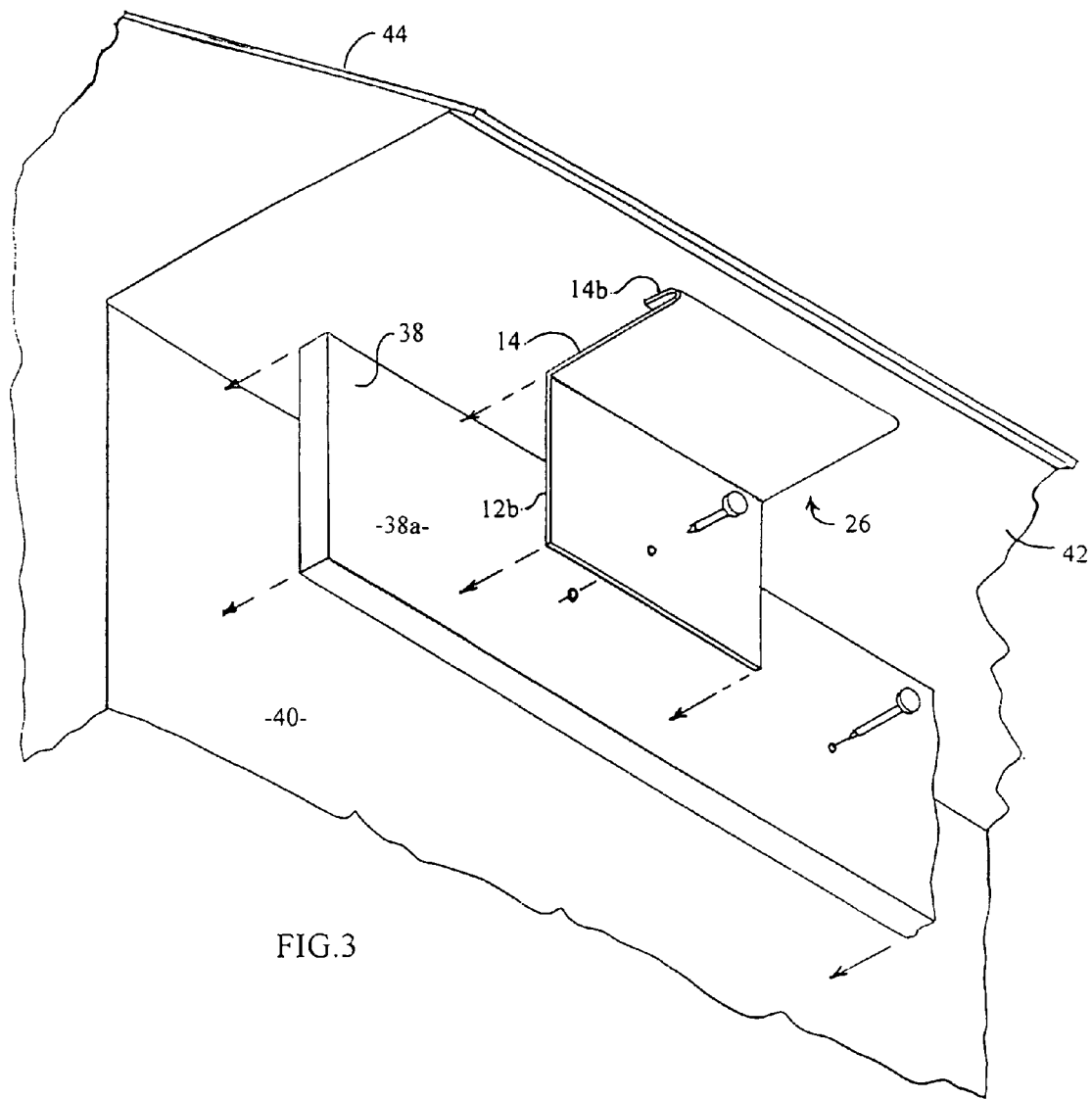
FIG. 3 is a perspective view of one segment of the eavestrough illustrated in FIG. 2 in conjunction with eaves of a building.

With reference first to FIG. 3, a panel 38 is first attached to the fascia 40 beneath the eaves 42 of an overhanging roof 44. The panel can be attached to the fascia by conventional means such as nails or screws. The inner segment 26 of the eavestrough is then rotated one quarter turn from the position illustrated in FIGS. 1 and 2 so that its inner cut portion 12b is adjacent to the front face 38a of the panel and its back wall 14 projects outward from the panel.

Figure 4:
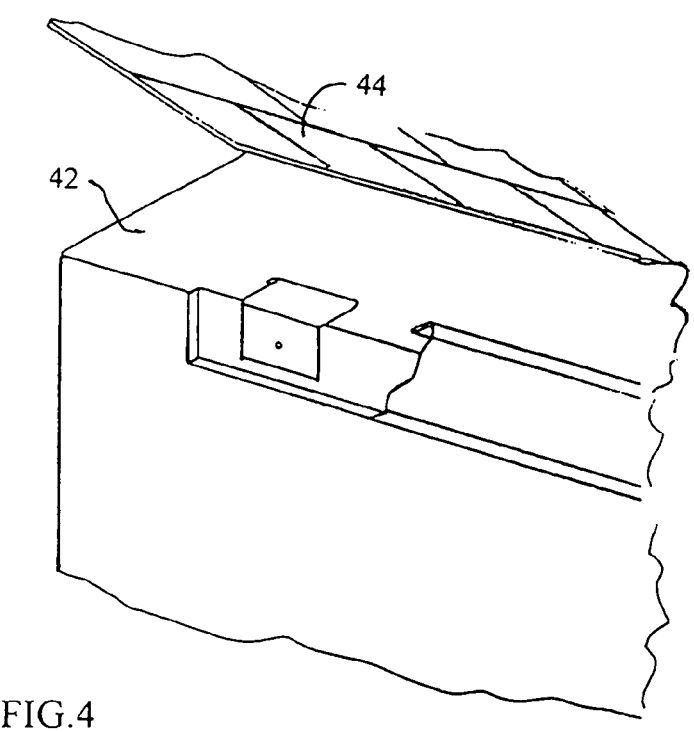
FIG. 4 is a perspective view of all the segments illustrated in FIG. 2 in conjunction with the eaves and overhanging roof of a building.
Figure 5:
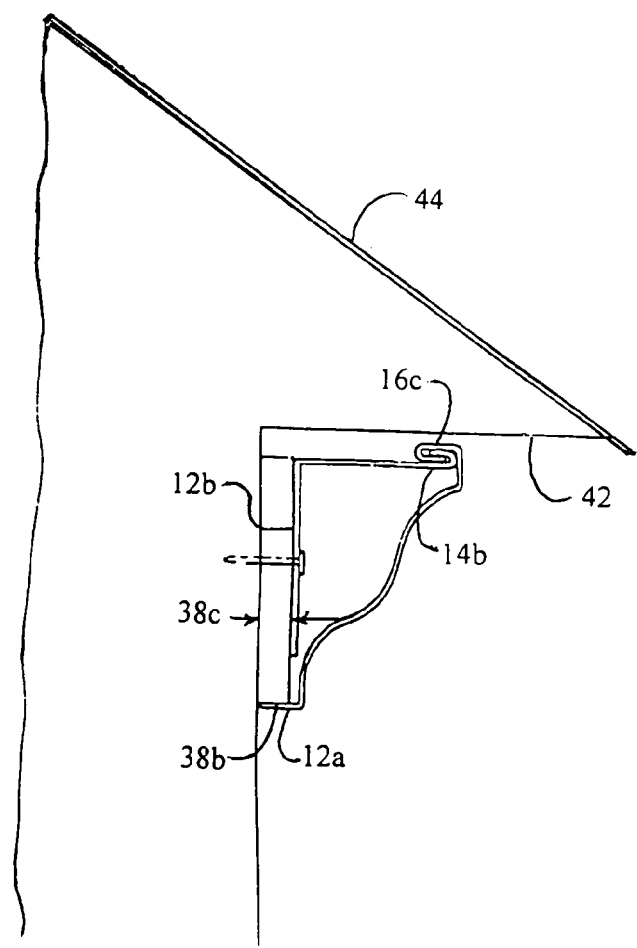
FIG. 5 is an side elevation of the segments of the eavestrough illustrated in FIG. 4.

With reference to FIGS. 4 and 5, the outer segment is then attached to the inner segment by fitting loop 16c into loop 14b. The front wall of the outer segment will then extend downward and cover the inner segment and the panel. The inner cut portion 12b should then be moved up or down on the panel until the outer cut portion 12a is adjacent to the lower edge 38b of the panel. The inner cut portion 12b is then attached to the panel by nails or screws after which the outer cut portion 12a is attached to the lower edge of the panel in order to immobilize the outer segment.

As illustrated in FIGS. 1 and 5, the longitudinal cut 20 made in the bottom wall of the eavestrough should be such that the width of the outer cut portion 12a is slightly greater than the thickness 38c of the panel. The outer segment will then completely cover the panel.

Figure 6:
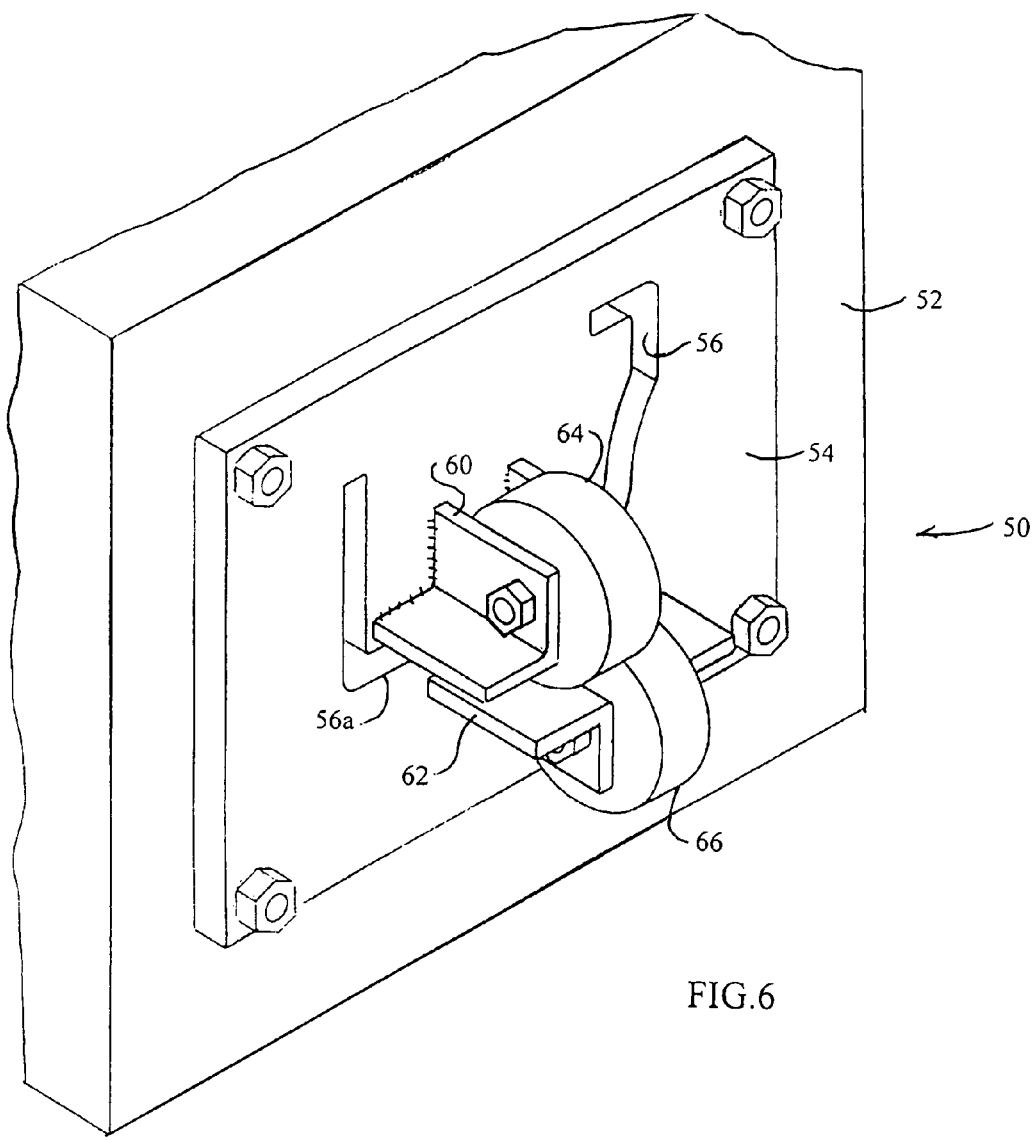
FIG. 6 is a perspective of the machine for cutting the eavestrough.
Figure 7:
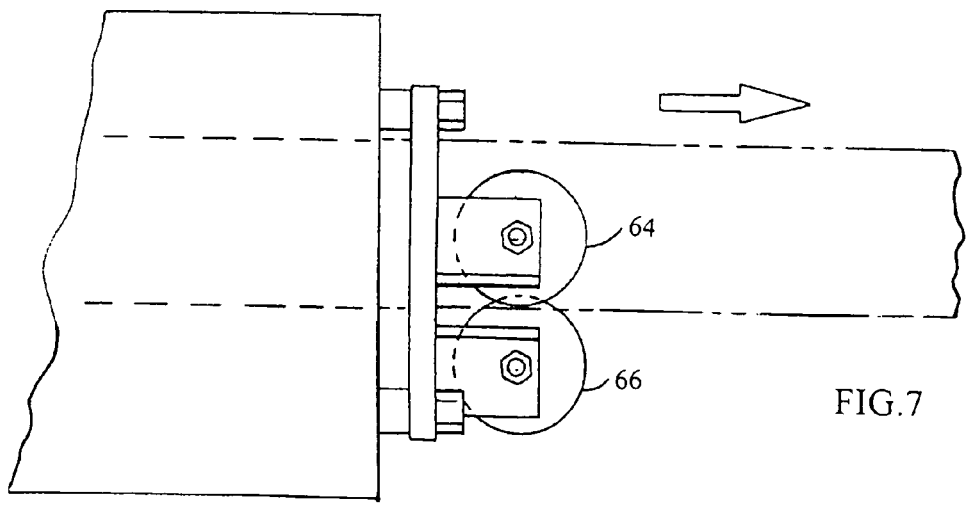
FIG. 7 is a side elevation of the cutting machine together with a length of eavestrough in phantom lines.
Figure 8:
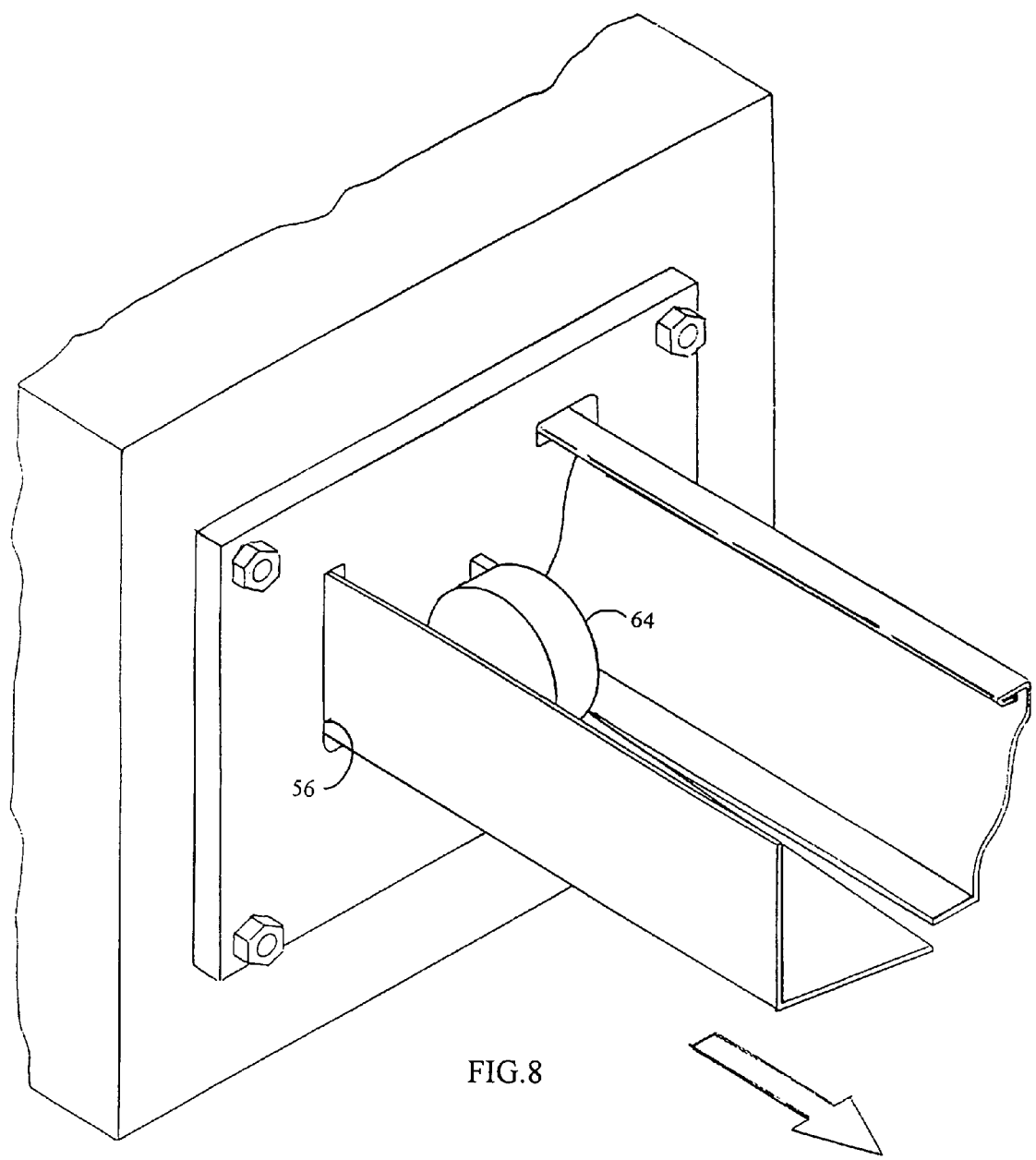
FIG. 8 is a perspective view of the cutting machine in conjunction with a portion of an eavestrough.

With reference to FIG. 6-8, the cutting machine of the invention, generally 50, includes a housing 52 to which a guide plate 54 is bolted. An opening 56 for sliding receipt of the eavestrough is formed in the guide plate. The opening is of a shape similar to that of the cross-section of the eavestrough but is slightly larger than the cross-section so that the eavestrough will advance through the opening with minimal lateral movement as it does so.

Two vertically spaced brackets 60, 62 are attached to the front wall of the guide plate and separate cutting wheels 64, 66 are rotatably attached to each bracket.

Figure 9:
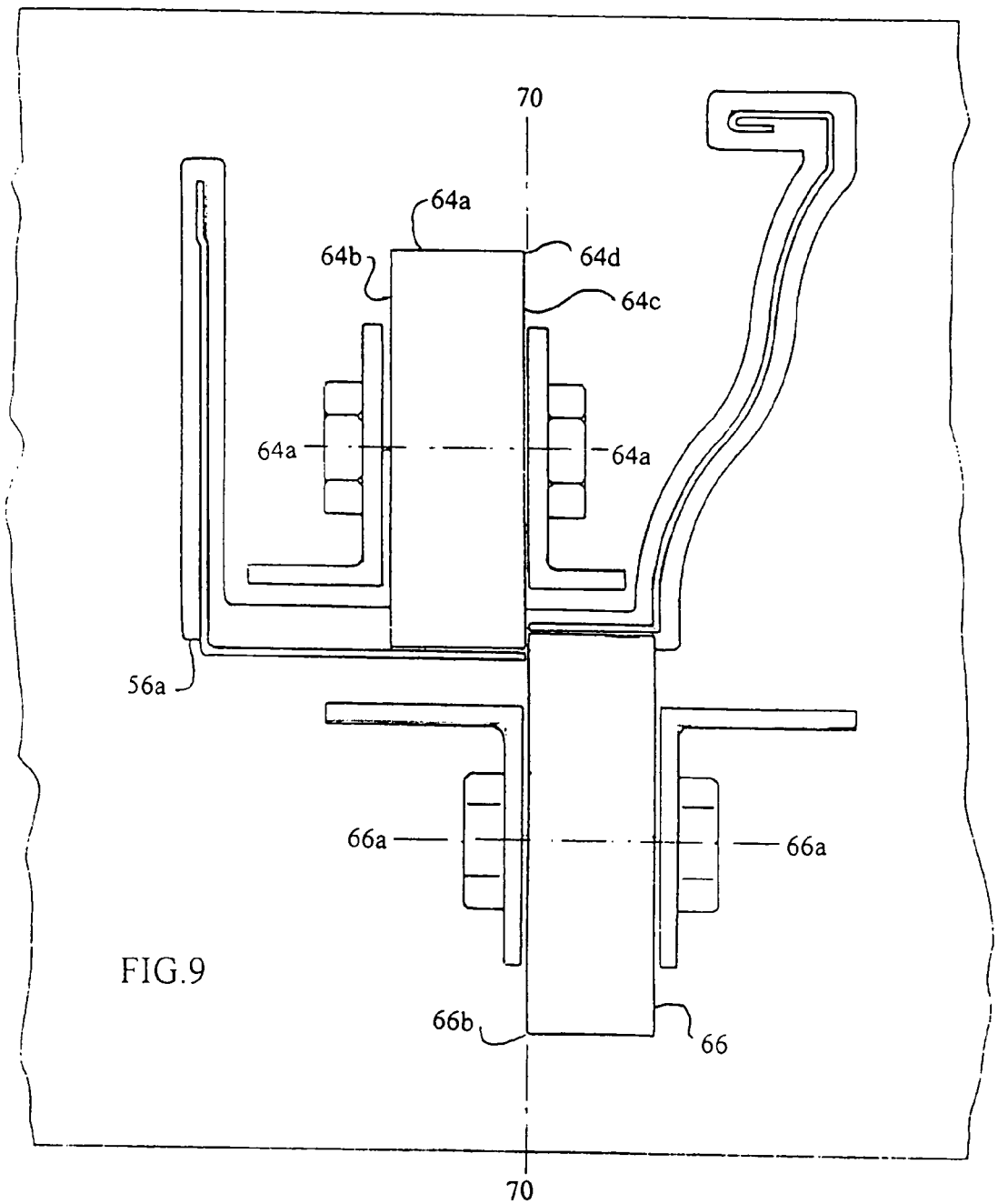
FIG. 9 is a front elevation of the cutting machine and a cross-section of an eavestrough.

With reference to FIG. 9, the wheels rotate about axes 64a-64a, 66a-66a which are parallel to each other and to the bottom portion 56a of the opening which admits the bottom wall of the eavestrough. Cutting wheel 64 has an outer cylindrical surface 64a oppositely facing side surfaces 64b,c and a circular cutting edge 64d at the intersection of the cylindrical surface 64a and side surface 64c. Cutting wheel 66 has an identical construction. The cutting wheels are positioned such that as the eavestrough advances into contact with the wheels, its bottom wall passes between cutting edges 64d and 66b with resulting formation of a longitudinally extending cut in its bottom wall.

The cutting wheels are positioned such that cutting wheel 64 is above the bottom wall while cutting wheel 66 is below the bottom wall. The cutting edges 64d, 66b lie in the same imaginary plane 70-70.

It will be understood of course, that modifications can be made in the moulding and the method of forming the moulding of my invention without departing from the scope and purview of the invention as defined in the appended claims.

I claim:

1. A method of forming a moulding upon an exterior surface of a building including the steps of:
   (i) providing an elongated eavestrough having a bottom wall and spaced apart upwardly extending front and back walls;
   (ii) forming a longitudinally extending cut in said bottom wall in order to sever said eavestrough into separate and apart outer and inner segments, said outer segment being composed of said front wall and an outer cut portion of said bottom wall while said inner segment is composed of said back wall and a remaining inner cut portion of said bottom wall;
   (iii) positioning said inner cut portion adjacent to said exterior surface such that said back wall projects outwardly of said exterior surface; and
   (iv) connecting said front wall to said back wall such that said front wall hangs downwardly from said back wall and further inwardly toward said exterior surface.

2. The method of claim 1 wherein said eavestrough has a longitudinal axis and further including the steps of:
   (v) providing a rectangular panel having oppositely facing front and rear faces, oppositely facing lower and upper edges and a predetermined thickness;
   (vi) attaching said panel to said exterior surface such that said lower edge faces downward and said front face faces outward;
   (vii) adjusting the position of said cut according to step (ii) such that the width of said outer cut portion, measured normal to said longitudinal axis, is greater than the thickness of said panel;
   (viii) attaching said inner cut portion to said front face in order to position said inner cut portion adjacent to said front face according to step (iii); and
   (ix) while carrying out step (iv) positioning said outer cut portion adjacent to said lower edge in order to completely cover said lower edge.

3. A method of forming a moulding upon an exterior surface of a building including the steps of:
   (i) providing an elongated eavestrough having a bottom wall, spaced apart back and front walls which extend upwardly from said bottom wall, said front wall having an upper lip folded back on itself;
   (ii) forming a longitudinally extending cut in said bottom wall in order to sever said eavestrough into separate and apart outer and inner segments, said outer segment being composed of said front wall and an outer cut portion of said bottom wall while said inner segment is composed of said back wall and the remaining inner cut portion of said bottom wall;
   (iii) folding an upper lip of said back wall back upon itself;
   (iv) positioning said inner cut portion adjacent to said exterior surface such that said back wall projects outwardly of said exterior surface; and
   (v) interconnecting said lips of said back and front walls such that said front wall extends downwardly from said interconnected lips toward said exterior surface.

4. The method of claim 3 wherein said eavestrough has a longitudinal axis and further including the steps of:
   (v) providing a rectangular panel having oppositely facing front and rear faces, oppositely facing lower and upper edges and a predetermined thickness;
   (vi) attaching said panel to said exterior surface such that said lower edge faces downward and said front face faces outward;
   (vi) adjusting the position of said cut according to step (ii) such that the width of said outer cut portion, measured normal to said longitudinal axis, is greater than the thickness of said panel;
   (viii) attaching said inner cut portion to said front face in order to position said inner cut portion adjacent to said exterior surface according to step (iv); and
   (ix) while carrying out step (v) positioning said outer cut portion adjacent to said lower edge in order to completely cover said lower edge.

* * * * *